United States Patent [19]

Ozawa et al.

[11] Patent Number: 5,062,886
[45] Date of Patent: Nov. 5, 1991

[54] PROCESS FOR PRODUCING METAL POWDER HAVING CONTROLLED PARTICLE SIZE DISTRIBUTION FOR METALLIC PIGMENTS

[75] Inventors: Sinya Ozawa; Katsumi Kondo; Kajin Saito, all of Nara, Japan

[73] Assignee: Showa Alumi Powder K.K., Nara, Japan

[21] Appl. No.: 531,593

[22] Filed: Jun. 1, 1990

Related U.S. Application Data

[62] Division of Ser. No. 406,388, Sep. 11, 1989, Pat. No. 4,976,777.

[30] Foreign Application Priority Data

Sep. 9, 1988 [JP] Japan .................................. 63-226197

[51] Int. Cl.$^5$ ................................................ B22F 9/04
[52] U.S. Cl. .......................................... 75/371; 209/5; 209/171
[58] Field of Search ....................... 209/5, 171; 75/343, 75/370, 371

[56] References Cited

U.S. PATENT DOCUMENTS 4,249,905  2/1981  Caswell ................................. 209/5

Primary Examiner—Melvyn J. Andrews
Attorney, Agent, or Firm—Sughrue, Mion, Zinn, Macpeak & Seas

[57] ABSTRACT

Disclosed is a graded metal powder for metallic pigment, comprising a metal powder wherein the metal powder has a mean particle size of from about 2.5 to about 15.0 μm, the content of particles having a particle size of not greater than 1 μm is not larger than about 0.5% by volume, and the metal powder has a particle size distribution such that not smaller than 97% by volume of the particles of the metal powder fall within the range between half the mean particle size of the metal powder and double the mean particle size of the metal powder. Also is disclosed a process for producing a graded metal powder by classifying metal particles dispersed in a mineral oil containing a nonionic-anionic surfactant.

5 Claims, 4 Drawing Sheets

PROCESS FOR PRODUCING METAL POWDER HAVING CONTROLLED PARTICLE SIZE DISTRIBUTION FOR METALLIC PIGMENTS

This is a divisional of Application No. 07/406,388 filed Sept. 11, 1989 now U.S. Pat. No. 4,976,777.

BACKGROUND OF THE INVENTION

The present invention relates to metal powders having a narrow particle size distribution for use in metallic pigments. The present invention also relates to a process for classifying fine metal powders.

DESCRIPTION OF PRIOR ART

Various metal powders are used in many fields such as powder metallurgy, pigments, reducing agents, catalysts and others. Among them, graded metal powders having relatively larger particle sizes, such as those for powder metallurgy, reducing agents or pigments, have heretofore been produced by classifying the metal powders having a broad particle size distribution which had been produced by grinding metals or atomizing molten metals using a sieve or an air classifier. In particular, in order to obtain an ornamental effect of metallic feeling or touch, fine metal powders for use in metallic pigments have been produced by selecting finer metal powder portion from the graded metal powder product, followed by expanding and grinding it using a ball mill or a stamp mill to form small flakes having a thickness of 0.2 to 2 $\mu$m and a surface area of 10 to 10,000 $\mu m^2$ in total of the opposite surfaces.

As stated above, the graded metal powders have conventionally been produced by classifying metal particles using sieves or by air stream classifiers. More specifically, the sieves used in industry have interstices of at least 30 $\mu$m, and therefore classification of metal particles having particle sizes smaller than 30 $\mu$m has heretofore been performed using air stream classifiers. However, the particle size distribution of metal powders obtained by air stream classification has been relatively broad. For this reason, when it is desired to produce finer metal powders for metallic pigments, it is necessary to strictly control the conditions of production, particularly those for expanding and grinding metal particles using a ball mill or a stamp mill, and heretofore, it has been very often and case that the quality of the fine metal powders for metallic pigments is not always uniform since metal particles are not always the same in size and in the chance of collision with balls in the ball mill or stamp mill or in the amount of force per unit surface area received by the particles.

For example, when metal powder which includes two kinds of particles, one having a diameter of 30 $\mu$m and another having a diameter of 2 $\mu$m, is ground using a ball mill, the force per unit area of cross-section urged on the particles having a diameter of 2 $\mu$m is 225 times as great as the force per unit are a of cross-section urged on the particles having a diameter of 30 $\mu$m, assuming that the balls in the ball mill have the same weight and collide with the two kinds of particles at the same velocity. In other words, the smaller particles can be expanded to form thin, small flakes with a smaller number of pinching actions by the balls, while the larger particles need a larger number of pinching actions for forming similar thin, small flakes, and during the grinding step, the grinding of the flakes derived from the smaller particles precedes, thus forming many ultrafine particles. Some of the ultrafine particles tend to be driven in the surfaces of the larger particles during their expansion to generate a number of flaws thereon. When a paint or coating material is prepared from the fine metal powder composed of the relatively large flakes having many flaws on their surface and many ultrafine particles as a pigment, and the resulting paint is coated on substrates such as a glass plate, the surfaces of the relatively large particles reflect light irregularly, the ultrafine particles dispersed in the coating layer also reflecting light irregularly, with the result that the coating layer fails to give a good luster or metallic feeling or touch.

Conventional processes for the classification of powders having a particle size not greater than 30 $\mu$m which do not react with water or air such as powders of oxides include a process in which the powders are dispersed in water and classified making use of the difference in the sedimentation rate in water of the particles in the powder according to their size. However, this process is not applicable to the classification of fine powders of metals, in particular, active metals such as magnesium, aluminum and titanium, because the powders of such metals are oxidized at high rates in water containing air, with the result that not only the chemical quality of the graded powder deteriorates but also the classification itself is prevented, thus failing to provide graded particles.

SUMMARY OF THE INVENTION

With a view to solving the above-described problems, the present inventors have intensively investigated developing a process for uniformly dispersing metal powder in a mineral oil in order to classify the powder. They have also investigated the appropriate width of particle size distribution for starting metal powder for stably and readily producing fine powder for use in a metallic pigment having satisfactory luster and metallic feeling. As the result, they have found the following, thus completing the present invention.

1) In order to uniformly disperse metal powders in mineral oils, it is necessary to use a surfactant. For this purpose, it is effective to add a suitable amount of a nonionic-anionic surfactant which has an HLB value being defined as an index representing the ratio of hydrophilic groups to lipophilic groups in the surfactant within a certain range, the ratio being represented by the formula: HLB = $11.7 \times$ log (molecular weight of hydrophilic group/molecular weight of lipophilic group) + 7.

2) To stably produce fine powders for metallic pigments having metallic luster, metal powders as starting material (hereafter, sometimes referred to as "starting metal powders") must have a small content of ultrafine powders having a particle size not greater than 1 $\mu$m, and the width of their particle size distribution must be narrow.

Therefore, an object of the present invention is to provide a process for classifying metal powders having a particle size of not greater than 30 $\mu$m to obtain graded metal powders having a narrow particle size distribution.

Another object of the present invention is to provide graded metal powders which can be used as a raw material for producing fine powders for metallic pigments and have a particle size distribution enabling the production of such fine powders to be conducted readily and stably.

Accordingly, in one aspect, the present invention provides a graded metal powder for metallic pigment, comprising a metal powder wherein said metal powder has a mean particle size of from about 2.5 to about 15.0 μm, the content of particles having a particle size of not greater than 1 μm is not larger than about 0.5% by volume, and said metal powder has a particle size distribution such that not smaller than 97% by volume of the particles of said metal powder fall within the range between half the mean particle size of said metal powder and double the mean particle size of said metal powder.

In another aspect, a process for producing a graded metal powder is provided, comprising:
  (a) providing a metal powder having a mean particle size of not greater than about 30 μm in a predetermined amount,
  (b) providing a mineral oil,
  (c) mixing said mineral oil with a nonionic-anionic surfactant having an HLB value of from about 5.5 to about 11.5, in a proportion of from about 1.8 to about 3.0% by weight based on the amount of said metal powder,
  (d) dispersing said metal powder in said mineral oil containing said nonionic-anionic surfactant to form a slurry, and
  (e) subjecting said slurry to sedimentation to classify said metal particles in said slurry.

BRIEF DESCRIPTION OF THE ATTACHED DRAWING

DETAILED DESCRIPTION OF THE INVENTION

Figure 1:
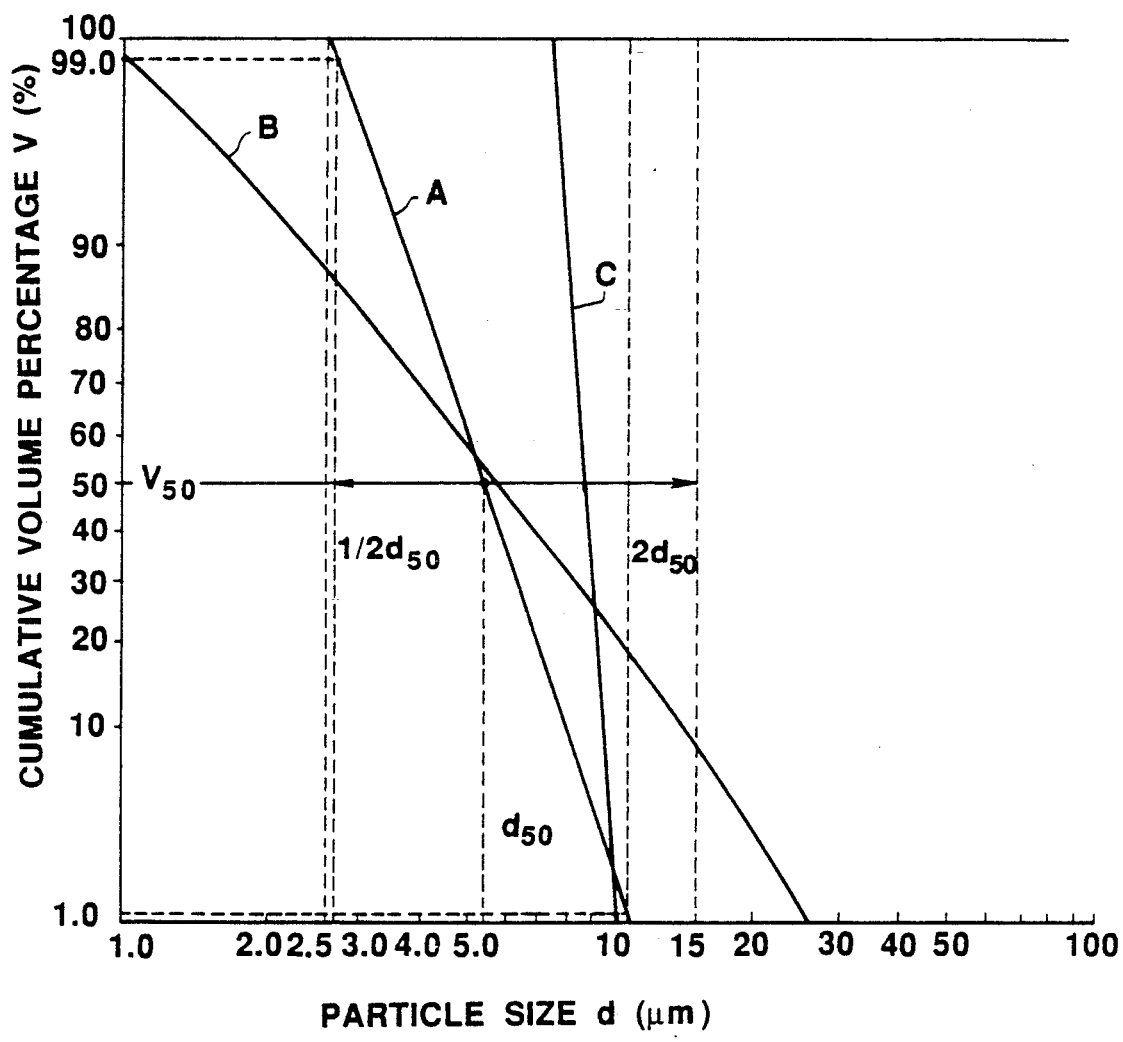
FIG. 1 is a graph illustrating the particle size distribution of the powder of the present invention.

Generally, when it is intended to classify a powder having a broad particle size distribution in a liquid to obtain powder groups having a sharp particle size distribution, at first the particles of the raw material powder have to be dispersed uniformly in the liquid to produce a slurry in an appropriate concentration so as not to prevent subsequent procedures of classification. Then, the slurry is subjected to classification, taking into consideration the Stoke's equation and finding the relationship between the particle size of the particles contained in the slurry and the sedimentation rate of the particles.

That is, according to the Stoke's equation, the sedimentation rate $(v)$ is proportional to the difference between the density of the particle $(\rho_P)$ and the density of the liquid $(\rho_L)$ and to the square of the particle size of the particle $(D_P)$, and inversely proportional to the viscosity of the liquid $(\eta)$:

$$v = \frac{g}{18} \cdot \frac{(\rho_P - \rho_L)}{\eta} \cdot D_P^2$$

in which g indicates the acceleration of gravity.

In the above equation, among others, $\rho_L$ and $\eta$ vary depending on the temperature of the slurry, and therefore it is necessary to strictly control the temperature of the slurry. It is also necessary to control so that there is substantially no difference in temperature within the slurry because convection will occur when there is a difference in the temperature within the slurry, which prevents classification with high precision.

Next, the procedures of classification are practiced using the relationship between the particle size and the sedimentation rate of the particles previously determined. That is, the slurry prepared is well agitated in a thermostatic classification bath and left to stand for a period of time which is necessary for particles having a particle size greater than that of the particles having a desired particle size to drop and settle to a position below the plane of a predetermined depth where recovery or withdrawal occurs. Then, the upper portion of the slurry in which those particles which have the desired particle size remain is recovered. Repeating the procedures a plurality of times, slurries containing particles having greater particle sizes can be separated successively to achieve classification of the particles.

After leaving the slurry to stand for a certain period of time the particles will have settled in the lower part of the classification bath to form a slurry layer of a high concentration in which even larger particles will not drop therein. The thickness of this high concentration slurry layer varies depending on various factors such as the value of $(\rho_P - \rho_L)$ in the Stoke's equation, $\eta$, and the size, particle size distribution and shape of the particles. Anyway, the depth of the upper portion of the slurry to be recovered has to be within the range where the Stoke's equation is valid with respect to the upper portion of the slurry. Theoretically, the smaller the depth of the upper slurry to be recovered, the sharper the particle size distribution of the particles after the classification. However, in practice, the upper portion of the slurry to be recovered is of a certain depth for the purpose of increasing accuracy.

In addition, as a variation of the sedimentation method, a selection tube method may also be used in which a liquid is flown from the lower part to the upper part of a selection tube at a flow rate which is slightly faster than the sedimentation rate of the particles having a desired particle size to have the particles having a desired particle size overflown.

In accordance with the process of the present invention, the following procedures are conducted.
  (1) At first, metal powder is uniformly dispersed in a mineral oil by adding a nonionic-anionic surfactant having an HLB value as defined above of 5.5 to 11.5 to the mineral oil in an amount of 1.8 to 3.0% by weight based on the weight of the metal powder, thus producing a slurry which enables classification with high accuracy. When ionic surfactants and those nonionic-anionic surfactants which have an HLB value of not greater than 5.4 and not smaller than 11.6 are used, the metal powder cannot be dispersed in the mineral oil uniformly. On the other hand, even when the nonionic-anionic surfactant having an HLB value of 5.5 to 11.5 is used, the metal powder cannot be dispersed well in the mineral oil if the amount of the surfactant to be used is not larger than 1.7% based on the weight of the metal powder, and re-agglomeration takes place if the amount of the surfactant to be used is not smaller than 3.1%, thus failing to produce suitable slurry to be subjected to classification.

(2) Then, the concentration of slurry, i.e., the weight ratio of the metal powder to total weight of the slurry, is desirably within the range defined by the following equation:

$$C_M < 100\rho_M/(6\rho_L + \rho_M)$$

where $C_M$ represents the concentration of the metal powder slurry in weight percentage (%), $\rho_L$ and $\rho_M$ stand for the density of the metal and that of the mineral oil, respectively, taking into consideration both the sharpness of the particle size distribution and the accuracy. However, the present invention is not limited to the above range since the accuracy of the graded powder product varies also depending on the method of classification.

(3) The slurry thus prepared is placed in a thermostatic classification bath and retained at a temperature of a standard temperature (20° to 30° C.)±5° C. Repeating the operations of agitation, standing (sedimentation of particles), and recovery of the upper layer of the slurry in which fine particles remain, a slurry is obtained which contains graded metal powder having a desired particle size.

(4) Slurry containing graded metal powder having a desired particle size distribution is filtered, and the mineral oil is removed as by heating under reduced pressure to obtain graded metal powder having a desired particle size or grading.

Metal powder of the present invention as a raw material for stably producing fine powder for use in metallic pigments having a luster of metallic feeling has a mean particle size in terms of cumulative volume particle size distribution being 50%, hereinafter referred to as "$d_{50}$", within the range of 2.5 to 15.0 μm. The metal powder contains ultrafine powder having a particle size of not greater than 1 μm in an amount of not more than about 0.5% by volume. It contains particles at least 97% by volume of which have particle sizes that fall within the range of $1/2d_{50}$ to $2d_{50}$ (μm). The relationship will be explained in greater detail with reference to the attached drawings.

FIG. 1 is a graph illustrating cumulative volume particle size distribution. The horizontal axis or abscissa indicates particle size d (μm), the vertical axis or ordinate indicates cumulative volume percentage V (%). Now plotting the cumulative volume particle size distribution of the fine powder of the present invention, curve A in FIG. 1 is obtained. More particularly, the particle size ($d_{50}$) at which the cumulative value of volume particle size distribution is 50% ($V_{50}$) is 5.4 μm, which value is between 2.5 μm and 15 μm. As to the cumulative volume percentage V, V=100 at d=2.5 μm. Particles having a particle size not greater than 1 μm are in an amount of not larger than 0.5% based on the total volume. Furthermore, $1/2d_{50}$ to $2d_{50}$ are 2.7 μm and 10.8 μm, respectively, and V values corresponding thereto are 99% ($V_{99}$) and 1% ($V_1$), respectively. The amount of the particles having particle sizes between 2.7 μm and 10.8 μm is 98% (>97%) based on the total volume.

In the case where the particle size distribution is broad as stated above, the slope or gradient of the curve is more lenient as shown in curve B in FIG. 1. On the other hand, sharp particle size distribution shows a steep gradient as shown in curve C in FIG. 1.

When the raw material metal powder used for producing pigment in the present invention has a $d_{50}$ value of not smaller than 15 μm, it takes a long period of time to expand and grind the powder, which leads to the occurrence of flaws on the surface of flakes formed during expansion, thus producing fine powder for use in metallic pigment having a poor luster of metallic feeling. When $d_{50}$ is not larger than 2.5 μm, the content of the particles having particle sizes of not greater than 1 μm increases. If the content of the ultrafine powder having particle size of not greater than 1 μm in the raw material metal powder exceeds 1%, relatively large flakes contained in the fine metal powder for pigments are attacked by the ultrafine powder such that the ultrafine particles are driven into the flakes, resulting in that the surface of the flakes deteriorates, thus providing metal powder having poor luster. On the other hand, when the particle size distribution of the raw material metal powder is relatively broad, i.e., below 97% of the particles have particle sizes which fall within the range of $1/2d_{50}$ to $2d_{50}$ μm, it is necessary to discontinue the expansion and grinding using a ball mill or stamp mill midway before large particles are expanded sufficiently, in order to sift the particles. This not only complicates the procedures but also causes the resulting ultrafine powder for metallic pigments to have broad particle size distribution and nonuniform thickness, thus failing to provide an acceptable luster of metallic feeling. In addition, when the expansion and grinding are not discontinued in the meantime until larger particles are expanded to a predetermined thickness, grinding also proceeds simultaneously. This results in that the number of ultrafine particles and of relatively large particles onto the surface of which the ultrafine particles are driven which have poor luster abruptly increase, with the result that the resulting ultrafine powder for metallic pigments has a poor luster of metallic feeling.

EXAMPLES

The present invention will be explained in greater detail with reference to examples and comparative examples. However, the present invention should not be construed as being limited to the examples.

EXAMPLE 1

1) In a steel vessel provided with a thermostatic jacket of 60 cm in diameter and 90 cm in depth (hereafter, referred to as a "classification bath") is charged 105 kg of Exxon Naphtha No. 6 (Nippon Petroleum Co., Ltd.) having a specific density of 0.8 and a viscosity of 1 cP at 25° C., as a mineral oil.

2) To the mineral oil are added 45 kg of aluminum atomized powder (product of Raynolds Inc.) (hereafter, referred to as "raw material aluminum powder") having a particle size distribution shown by curve 1 in FIG. 2 and 840 g of PLYSURF 210G (nonionic-anionic surfactant produced by Daiichi Kogyo Seiyaku Co., Ltd., HLB: 9.6) and the mixture is agitated sufficiently to produce a slurry containing raw material aluminum powder in an amount of about 30% by weight.

3) Then, the slurry is left to stand for 8 hours, and then the upper portion of the slurry is pumped out to a depth of 27 cm from the original height of the surface of the slurry in about 15 minutes. The slurry pumped out is filtered under pressure using a filter press to separate ultrafine powder having a particle size of not greater than 1 μm from the mineral oil to recover the powder. The amount of the ultrafine powder is about 1 kg.

4) Then the same mineral oil as used in 1) above is replenished to the slurry in the classification bath to a height of 27 cm (61 kg), thus supplementing the mineral oil. Thereafter, the slurry is agitated again for 1 hour.

Figure 2:
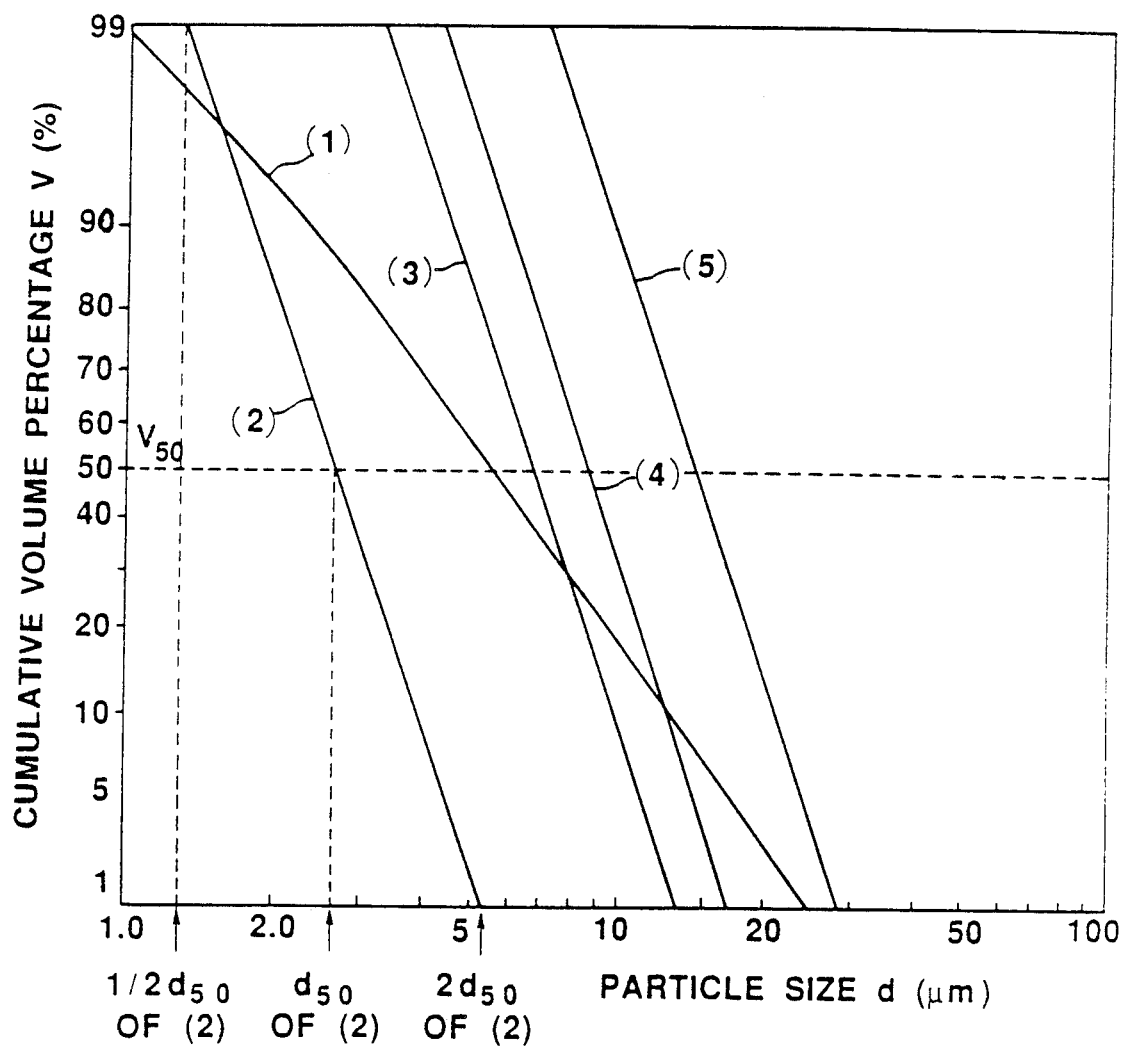
FIG. 2 is a graph illustrating the particle size distribution of the powder according to an example of the present invention.

5) After leaving the slurry to stand for 3 hours, the same operation as in 3) above is repeated to obtain about 17 kg of graded aluminum powder (2) shown by (2) in FIG. 2.

6) The same operation in 4) above is repeated.

7) After leaving the thus-treated slurry to stand for 1 hour, the same operation as in 3) above is conducted to obtain about 12 kg of graded aluminum powder shown by (3) in FIG. 2.

8) Further, the same operation as in 4) above is repeated.

9) After leaving the system to stand for 15 minutes, the same operation as in 3) is repeated to obtain about 8 kg of graded aluminum powder shown by (4) in FIG. 2.

10) The same operation as in 4) above is repeated.

11) After leaving the system to stand for 15 minutes, the upper portion of the slurry is pumped out in 15 minutes to a depth of 40 cm from the surface of the slurry, and the slurry thus-pumped out is treated with the same operation as in 3) above to obtain about 6 kg of graded aluminum powder (5).

12) At the end of the classification operation, the slurry which remains at the bottom of the classification bath is pumped out, which is then treated with the same operation as in 3) above to obtain about 1 kg of classified aluminum crude powder having a particle size of not smaller than 25 μm.

One (1) kg aliquot of each of the graded aluminum powders (2), (3), (4) and (5) obtained by the abovedescribed classification procedures is expanded and ground using the same ball mill under the same operational conditions except that the time for expansion and grinding are set at 6 hours for (2), 7 hours for (3) and 8 hours for (4), and 10 hours for (5) to produce fine powder of aluminum pigment.

Microscopic observation is made on the fine powders thus-obtained, and the mean particle size of the expanded powder, the content of applied or driven-in powder, and the shape of the flaky powder are observed and determined. The results obtained are shown in Table 1 below.

In addition, paints are prepared using the fine powders of aluminum pigment and coated on a substrate such as a glass plate to form a coating layer. The metallic luster of the respective coating layers is observed. The results obtained are also shown in Table 1 below.

TABLE 1

| | Powder | | | | |
|---|---|---|---|---|---|
| | (1) | (2) | (3) | (4) | (5) |
| Particle Size Analysis | | | | | |
| Mean particle size d50 (μm) | 5.5 | 2.7 | 6.6 | 8.6 | 14.0 |
| Proportion of particles having a particle size of not greater than 1 μm (%) | 1.5 | 0.0 | 0.0 | 0.0 | 0.0 |
| Proportion of particles of ½d50 to 2d50 (%) | 65.5 | 98.0 | 97.5 | 98.0 | 98.0 |
| Microscopic Observation of Expanded and Ground Particles | | | | | |
| Mean particle size (μm) | 15 | 6 | 18 | 20 | 30 |
| Thickness (μm) | 0.5 | 0.4 | 0.6 | 1.0 | 2.0 |
| Content of driven-in particles (%) | 100 | 0.0 | 0.0 | 0.0 | 0.0 |
| Shape of flaky powder | Poor | Fair | Fair | Fair | Fair |
| Observation of Coating Layer | | | | | |
| Degree of metallic luster | Poor | Fair | Fair | Fair | Fair |

The "thickness of flake" is calculated by the following equation.

$$X\ (\mu m) = \frac{2 \times (d_{50})^3}{3 \times (\text{mean particle size of expanded powder})^2}$$

The "content of applied powder" is a proportion of the number of applied flaky particles to the total number of expanded flaky particles (about 600 particles) in the field of view of micrograph (magnification: ×500, 20×30 cm)

The "shape of a flaky powder" is judged to be "fair" when not less than 90% of flaky particles have somewhat round peripheries while it is judged to be "poor" when there are observed not less than 10% of flaky particles having rugged or notched peripheries.

The "metallic luster of coating layer" is judged by coating a paint containing 5% of fine powder of aluminum pigment on a glass plate of a size of 10 cm×20 cm and observing the coating layer after drying under day light with the naked eye. When the coating layer has a metallic luster of white silver color all over the surface, it is judged to be "fair" while it is judged to be "poor" when the metallic luster is weak.

Figure 4:
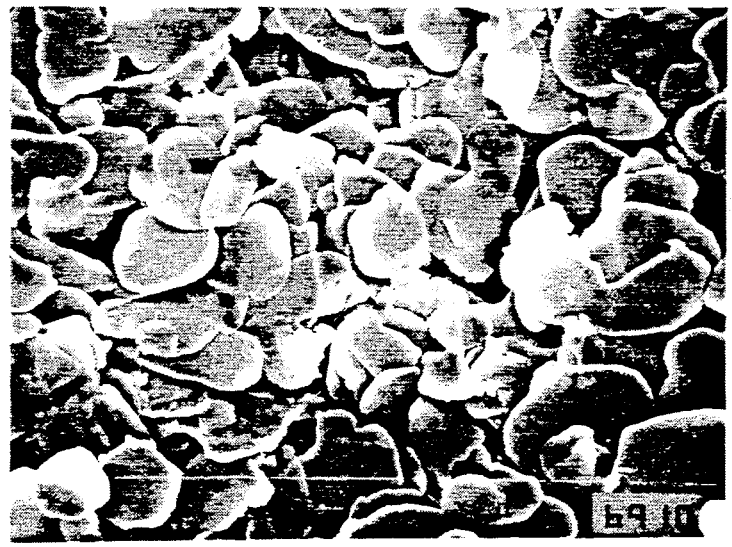
FIG. 4 is an electron micrograph showing the microstructure of the particles of the powder of the present invention.
Figure 5:
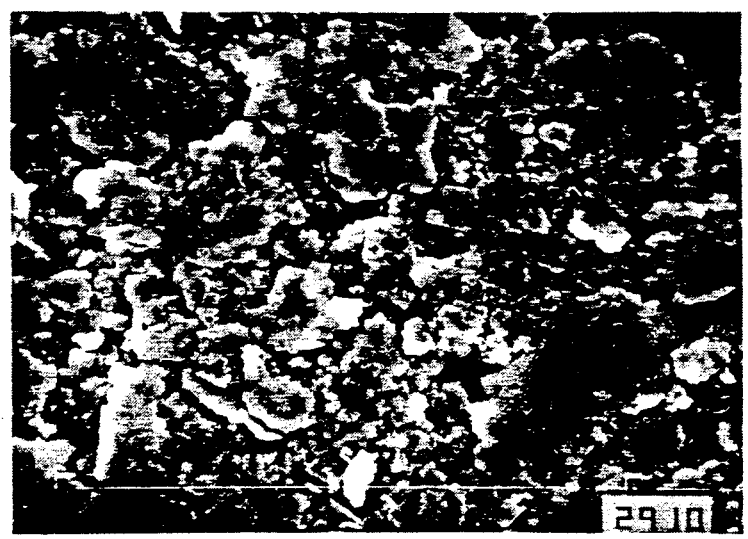
FIG. 5 is an electron micrograph showing the microstructure of the particles of a conventional powder

FIG. 4 is a micrograph of micro powder of aluminum pigment obtained from the graded aluminum powder (3) as a typical example. On the other hand, FIG. 5 is a micrograph of fine powder of aluminum pigment obtained from the raw material aluminum powder (1) as a comparison.

EXAMPLES 2 through 5

Graded aluminum powders having the smallest mean particle size (d50) corresponding to the graded aluminum powder (2) in Example 1 are prepared in the same manner as in Example 1 except that various surfactants having different HLB values are added and the amount of the surfactants is varied. The particle size of each powder is shown in Table 2 below.

TABLE 2

| | Example | | | |
|---|---|---|---|---|
| | 2 | 3 | 4 | 5 |
| Surfactant | | | | |
| Trade Name | PLYSURF A210G | PLYSURF A210G | PLYSURF A215C | RM410 |
| Manufacturer | Daiichi Kogyo Co., Ltd. | Daiichi Kogyo Co., Ltd. | Daiichi Kogyo Co., Ltd. | Toho Kagaku Kogyo Co., Ltd. |
| HLB value | 9.6 | 9.6 | 11.5 | 5.8 |
| Amount | 1.8 | 3.0 | 1.9 | 1.9 |
| Particle Size Distribution | | | | |
| Mean particle size d50 (μm) | 2.5 | 2.6 | 2.8 | 2.7 |

TABLE 2-continued

| | Example | | | |
|---|---|---|---|---|
| | 2 | 3 | 4 | 5 |
| Proportion of particles having a particle size of not greater than 1 μm (%) | 0.5 | 1.0 | 0.0 | 0.0 |
| Proportion of particles of ½d$_{50}$ to 2d$_{50}$ (%) | 97.0 | 97.0 | 97.5 | 98.5 |

COMPARATIVE EXAMPLE 1

Figure 3:
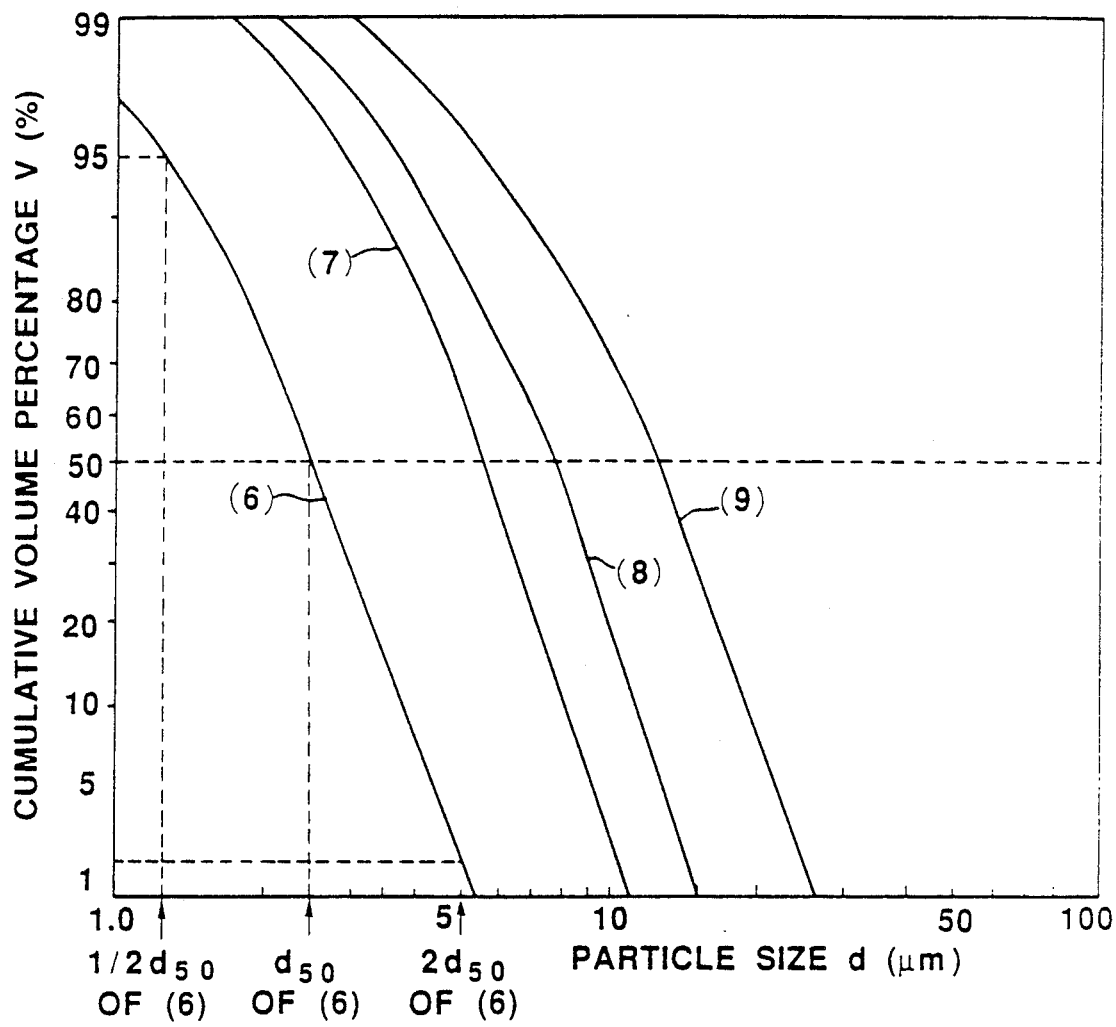
FIG. 3 is a graph illustrating the particle size distribution of the powder according to comparative example.

Using the same raw material powder (1) as used in Example 1, the same classification operation as in Example 1 is repeated except that the amount of the surfactant to be added is changed to 1.7% to obtain aluminum powders shown by (6), (7), (8) and (9) in FIG. 3 (hereafter, referred to as "graded aluminum powders").

One (1) kg aliquout of each of the graded aluminum powders (6), (7), (8) and (9) obtained by the abovedescribed classification procedures and of the raw material aluminum powder is expanded and ground using the same ball mill under the same operational conditions as in Example 1 except that the time for expansion and grinding are set 6 hours for (6), 7 hours for (7) and the raw material aluminum powder (1) and 8 hours for (8), and 10 hours for (9) to produce fine powder of aluminum pigment.

Microscopic observation is made on the fine powders thus-obtained, and the mean particle size of the expanded powder, the content of applied or driven-in powder and the shape of the flaky powder are observed and determined. The results obtained are shown in Table 3 below.

In addition, paints are prepared using the fine powders of aluminum pigment and coated on a substrate such as a glass plate to form a coating layer. The metallic luster of the respective coating layers is observed. The results obtained are also shown in Table 3 below.

TABLE 3

| | Powder | | | | |
|---|---|---|---|---|---|
| | (1) | (6) | (7) | (8) | (9) |
| Particle Size Analysis | | | | | |
| Mean particle size d$_{50}$ (μm) | 5.5 | 2.5 | 5.6 | 7.7 | 12.7 |
| Proportion of particles having a particle size | 1.5 | 3.5 | 0.5 | 0.0 | 0.0 |

TABLE 3-continued

| | Powder | | | | |
|---|---|---|---|---|---|
| | (1) | (6) | (7) | (8) | (9) |
| of not greater than 1 μm (%) | | | | | |
| Proportion of particles of ½d$_{50}$ to 2d$_{50}$ (%) | 65.5 | 91.5 | 93.5 | 91.5 | 89.0 |
| Microscopic Observation of Expanded and Ground Particles | | | | | |
| Mean particle size (μm) | 15 | 6 | 15 | 18 | 27 |
| Thickness (μm) | 0.5 | 0.3 | 0.5 | 0.9 | 1.8 |
| Content of driven-in particles (%) | 100 | 50 | 20 | 35 | 60 |
| Shape of flaky powder | Poor | Poor | Poor | Poor | Poor |
| Observation of Coating Layer | | | | | |
| Degree of metallic luster | Poor | Poor | Poor | Poor | Poor |

COMPARATIVE EXAMPLE 2 through 7

In the same manner as in Example 1, classification operation is tried. When no surfactant is added, ionic surfactant or nonionic-anionic surfactant having an HLB value of not smaller than 12.1 or not greater than 5.4 is added, or the amount of the surfactant added is not more than 1.6%, the dispersion of the raw material aluminum powder in the mineral oil is poor. On the other hand, when the amount of the surfactant added is not less than 3.1%, agglomeration occurs and separation of the mineral oil from the raw material aluminum powder starts, thus failing to provide a good slurry. In all the cases above, classification is difficult to conduct and no graded aluminum powder can be obtained. These results are summarized in Table 4 below.

TABLE 4

| | Example | | | | | |
|---|---|---|---|---|---|---|
| | 2 | 3 | 4 | 5 | 6 | 7 |
| Surfactant | | | | | | |
| Trade Name | PLYSURF A210G | PLYSURF A210G | RP-710 | RP-710 | EMAMINE CS | None |
| Manufacturer | Daiichi Kogyo Co., Ltd. | Daiichi Kogyo Co., Ltd. | Toho Kagaku Kogyo Co., Ltd | Toho Kagaku Kogyo Co., Ltd. | Kyoei Co., Ltd | — |
| HLB value | 9.6 | 9.6 | 11.9 | 11.9 | anionic | |
| Amount (%) | 1.6 | 3.1 | 1.9 | 1.9 | 1.9 | |
| Particle Size Distribution | | | Classification is impossible since all samples are poorly dispersible | | | |
| Mean particle size d$_{50}$ (μm) | | | | | | |
| Proportion of particles having a particle size of not greater than 1 μm (%) | | | | | | |
| Proportion of particles of ½d$_{50}$ to 2d$_{50}$ (%) | | | | | | |

Various other factors such as the concentration and temperature of the slurry, time period for which the slurry is left to stand, the depth of the slurry to be pumped out, and the pumping rate are important factors when it is intended to improve the accuracy of classification. However, these factors vary depending on the kind of the metal powders, the structure of classifiers and other factors and for simplicity's sake, they are set the same as in Example 1.

This time, no aluminum powder is obtained which has a d$_{50}$ value of not smaller than 15 μm and a particle size distribution such that not less than 97% of the particles fall within the range of 1/2d$_{50}$ to 2d$_{50}$, and thus it is impossible to present such data as comparison.

Although the present invention ha been explained with reference to preferred embodiments thereof, it is not limited thereto and various modifications can be made without departing the spirit and scope of the present invention.

What is claimed is:

1. Process for producing a graded metal powder, comprising:
   (a) providing a metal powder having a mean particle size of not greater than about 30 μm,
   (b) providing a mineral oil,
   (c) mixing said mineral oil with a nonionic-anionic surfactant having an HLB value of from about 5.5 to about 11.5, in a proportion of from about 1.8 to about 3.0% by weight based on the amount of said metal powder,
   (d) dispersing said metal powder in said mineral oil containing said nonionic-anionic surfactant to form slurry, and
   (e) subjecting said slurry to sedimentation to classify said metal particles in said slurry.

2. The process of claim 1, wherein the graded metal powder comprises a metal powder wherein said metal powder has a mean particle size of from about 2.5 to about 15.0 μm, the content of particles having a particle size of not greater than 1 μm is not more than about 0.5% by volume, and said metal powder has a particle size distribution such that not less than 97% by volume of the particles of said metal powder fall within the range between half the mean particle size of said metal powder and double the mean particle size of said metal powder.

3. The process of claim 2, wherein the sedimentation is conducted at a slurry temperature of 20° to 30° C. and there is substantially no difference in temperature within the slurry.

4. The process of claim 3, wherein the weight ratio of the metal powder to the total weight of the slurry is within the range defined by the equation $$C_M < 100 p_M / (6 p_L + p_M)$$

wherein $C_M$ represents the concentration of the metal powder of the slurry in weight % and $p_L$ and $p_M$ stand for the density of the metal and the mineral oil, respectively.

5. The process of claim 1, wherein said graded metal powder is aluminum.

* * * * *